US006233074B1

(12) United States Patent
Lahat et al.

(10) Patent No.: US 6,233,074 B1
(45) Date of Patent: May 15, 2001

(54) RING NETWORKS UTILIZING WAVE DIVISION MULTIPLEXING

(75) Inventors: Amir Lahat, Brenner; Yakov Sfadya, Kfar Sabe, both of (IS)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/080,450

(22) Filed: May 18, 1998

(51) Int. Cl.$^7$ ........................................ H04J 14/02

(52) U.S. Cl. .......................... 359/118; 359/119; 359/125

(58) Field of Search ..................... 359/117, 118, 359/119, 124, 125, 161, 164, 166, 167, 173, 174, 176, 177, 178, 179; 370/424, 258

(56) References Cited

U.S. PATENT DOCUMENTS

| 5,483,536 | | 1/1996 | Gunji et al. ................. 370/85.14 |
| 5,550,818 | | 8/1996 | Brackett et al. ................. 370/60 |
| 5,566,014 | | 10/1996 | Glance ................. 359/124 |
| 5,576,875 | * | 11/1996 | Chawki et al. ................. 359/125 |
| 5,617,233 | * | 4/1997 | Boneck ................. 359/123 |
| 5,625,478 | * | 4/1997 | Doerr et al. ................. 359/125 |
| 5,760,934 | * | 6/1998 | Suffer et al. ................. 359/119 |
| 5,920,412 | * | 7/1999 | Chang et al. ................. 359/128 |
| 5,930,016 | * | 7/1999 | Brorson et al. ................. 359/127 |

FOREIGN PATENT DOCUMENTS 43 37 089    5/1995  (DE) ............... H04B/10/20

OTHER PUBLICATIONS

Perlman, R., "Interconnections: Bridges and Routers", Addison–Wesley Publishing, Section 9.2.4, Chapter 9, pp. 205–264 (1992).

Sedgewisk, R., "Algorithms" Second Edition, Addison–Wesley Publishing, Chapter 17, pp. 245–257 (1988).

Doering, W. et al., "Routing on Longest–Matching Prefixes", *IEEE/ACM Transactions on Networking,* vol. 4, No. 1, Feb. 1996, pp. 86–97.

Williams, K.A., "A Distributed ATM Network Based on an Optical Passive Star", printed from website http://williams.cs.ncat.edu/ATMStar.htm, 2 pages, (1998).

"All–optical ATM–Switch based on Self Electro-optic Effect Devices (SEED's)", printed from website hhtp://www.stw.nl/projecten/T/tel3997.html, 2 pages, Feb. 2, 1997.

Chang, G. et al., "Multiwavelength Reconfigurable WDM/ATM/SONET Network Testbed", Journal of Lightwave Technology, vol 14, No. 6, Jun. 1996.

(List continued on next page.)

*Primary Examiner*—Leslie Pascal
(74) *Attorney, Agent, or Firm*—Howard Zaretsky; David J. Weitz; Wilson Sonsini Goodrich & Rosati

(57) ABSTRACT

An optical add drop module (OADM) to enable the construction of ring networks. WDM is utilized to construct a ring type network suitable for use in both WAN and LAN environments. The network is constructed having a ring topology with a plurality of nodes connected around the ring in daisy chain fashion. Direct connections between any two end users can be established to permit unicast connections. Multicast connections are also possible from a source to several destinations. Each unicast or multicast connection between nodes utilizes a separate specific wavelength. Devices are connected to the ring network via an optical add drop module. Wavelengths pass optically through the OADM device on nodes that are intermediary to the two end nodes on either side of the connection. Only the two end nodes transmit or pickup the optical signals on that particular wavelength corresponding to the connection. Capacity in the network is easily increased by adding more optical channels on the fiber, with each channel comprising a different wavelength.

14 Claims, 8 Drawing Sheets

OTHER PUBLICATIONS

Oguchi, K., "Novel Wavelength–Division–Multiplexed Ring Network Architecture Usin Optical Path Technology for Multiple Services and Simple Media Access Control Procedure", Fiber and Integrated Optics, 16: pp. 159–180., 1997.

Karol M., "Exploiting the Attenuation of Fibre–Optic Passive Taps to Create Large High–Capacity LAN's and MAN's", Journal of Lightwave Technology, vol. 9, No. 3, Mar. 1991.

* cited by examiner

RING NETWORKS UTILIZING WAVE DIVISION MULTIPLEXING

FIELD OF THE INVENTION

The present invention relates generally to data communications networks and more particularly relates to a ring network that utilizes wave division multiplexing (WDM) to increase the capacity of the network.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol in the ATM switch. ATM provides the User Network Interface (UNI) which is typically used to interconnect an ATM user with an ATM switch that is managed as part of the same network.

Current LAN Topology

Using ATM network technology as an example, the current topology of high performance ATM local area networks (LANs) includes ATM core switches at the backbone and an edge device having an ATM downlink to the one or more core switches. When a connection is established between two edge devices, the traffic must pass through the ATM switches in the core. Therefore, in order to support all potential connections between all edge devices, the ATM switches at the core need to be non blocking. Non blocking ATM switches are difficult to develop and thus are much more expensive.

In addition to the above disadvantage, the resulting network may be limited in bandwidth. When attempting to establish large numbers of connection from the edge device, there may be a need for faster downlink data rates. Depending on the number of connections and the throughput required for each connection, the downlink capacity may not be sufficient to meet the needs of users.

An additional disadvantage is the amount of physical wiring required to implement such a network. In practice, each edge device must be connected to the ATM core via physical wires (i.e., cables). When considering a typical office building there may be many wires installed in parallel. A separate cable from each edge device on each floor must be run to the ATM core farm which typically is located in the basement. Wherever the switch core farm or server firm is located, cables must be run from the switch core farm to each edge device. The total length of the required cabling can be relatively high and thus have an associated very high cost.

The cost may be even higher depending on the type and length of cabling used. For example, in ATM networks, it is common to run high speed fiber optic cable from the ATM switch core to all the edge devices in the network. Data rates may range from OC-3 155 Mbps to OC-12 622 Mbps on the optical fiber, for example. Note that each optical fiber used in the network carries only a single communication channel using a single wavelength of light. If it is desired to maintain several communications channels at one time, more than one optical fiber is required. Using prior art transmission techniques, each communication channel requires a separate optical fiber.

Today, most legacy local area networks utilize ATM technology in combination with and on Switched fathered or Token Ring network topologies. The existing switching technology enables each user on the network to have their own dedicated bandwidth, e.g., 10 Mbps or 100 Mbps, for their networked software applications. Each user is given network connectivity to the local switched hub, e.g., 100 Mbps for a Fast Ethernet network interface card (NIC). In typical office building environments, each floor is provided with one or more switched hubs that users are directly connected to. If the switched hub has sixteen 10 Mbps ports it may potentially be forced to handle a 1,600 Mbps data rate from all the connected users.

Currently available conventional technology, using electrical processing, forces the switched hub to analyze every bit of information and to determine its destination. Even in the event where most of the data is not switched between the local ports on the switch but rather is passed up to higher levels of switching, all the information must be still analyzed by the switched hub. This bottleneck for data that is not switched locally leads to high data rates within the switch. The high internal data rates result in a more complicated design in terms of both hardware and software, thus increasing the cost of the switch.

A diagram illustrating a prior art example network having multiple levels is shown in FIG. 1. The network, generally referenced 10, is a typical Ethernet network comprising a switched hub 12 labeled C connected to two switched hubs 14 labeled A and B. The switched hubs 14 comprise a first level of processing and the switching hub 12 comprises a second level of processing. Switching hubs 14 are connected to a plurality of end users 16 labeled end user #1 through end user #6.

Connections between end users in the network can be established on the same switched hub or may be established between different switched hubs. For example, a connection between end user #1 and end user #2 requires only one level of processing on switched hub A. On the other hand, a connection between end user #1 and end user #4 requires the operation of three different processing engines: (1) the processing engine in switched hub A (2) the processing engine in switched hub C and (3) the processing engine in switched hub B. It is important to note that switch hub C processes data even though it did not require the data for purposes other than to transfer data from a port connected to switched hub A to a port connected to switched hub B.

A diagram illustrating a prior art Token Ring network is shown in FIG. 2. The Token Ring network, generally referenced 20, comprises a plurality of stations 22 labeled station 1 though station 8 connected in a daisy chain fashion so as to form a ring. In this type of network, when a connection is made, for example between station 1 and station 5, each station in between the two end stations are required to process the header portion of the message in order to determine if the message is relevant or not for that particular station. The processing overhead of this type of network is even higher than in the switched Ethernet network described in connection with FIG. 1.

A diagram illustrating a prior art network topology of an example building infrastructure is shown in FIG. 3. For clarity sake, only three floors of the building are shown, but the example can easily be extended to buildings having any number of floors. In addition, the example shown is for an Ethernet network. Other network types such as Token Ring and FDDI could also be used.

The example presented, depicts a networking strategy commonly used today. The network is an all Ethernet network comprising a plurality of switches (switching hubs) connected to a network backbone 50. Each floor has one or more switched hubs connected to end users 54. Floor #1 has two switches 70, 72; floor #2 has two switches 66, 68 and floor #3 has one switch 52. Each switch comprises a port interface section 58, switch section 56 and an interface 53 which is typically at a higher speed that the port interfaces. A plurality of ports 60 connected the end users 54 to the switch.

Each switch on each floor is connected via a dedicated physical cable to the network backbone. Switch 72 is connected to the network backbone via cable 80, switch 70 via cable 78, switch 68 via cable 76, switch 66 via cable 74 and switch 52 via cable 64. The network backbone comprises one or more switches 62 connected in some arrangement. In addition, the switches or other network equipment from one or more other buildings may be connected to this network. An example of a suitable workstation Ethernet switch is the LinkSwitch 2700 manufactured by 3Com Corporation, Santa Clara, Calif.

Each end user on the network is connected to a port in one of the switches at a rate of either 10 or 100 Mbps. The link between each switch and the network backbone may be over fiber optic cable at Fast Ethernet or 1 Gbps data rates, for example. Alternatively, the downlinks from each of the switched hubs to the network backbone can be a protocol other then Ethernet such as ATM, FDDI, etc. For example, the interface portion 53 may comprise an ATM interface, FDDI interface, etc. If a protocol other then Ethernet, e.g., ATM, is used on the downlinks from the switched hubs to the network backbone, then some form of local area network emulation (LANE) must be used to provide Ethernet connectivity between end users.

In many cases, the protocol in use on the downlinks will differ from the protocol used on the connections to the end users, e.g., 10 Mbps to the end users and ATM on the downlinks. It is important to note, however, that regardless of the protocol used on the downlinks, a separate cable (optical fiber or copper) is required from each switched hub to the network backbone.

This commonly used network topology has several disadvantages. One disadvantage is that depending on the length and type of cabling used, the cost could end up being quite high. In addition, depending on the number of switches used in the network, the number of individual fiber optic cables could be very high. Another disadvantage is that the bandwidth available from each floor to the network backbone is limited. For example if fast Ethernet 100 Mbps is used. that the maximum bandwidth available to the switch is no more than 100 Mbps, no more.

Also, another disadvantage is that the only type of connections possible using such a network topology are point to point connections. Multicast connections are possible but they are not simple or trivial to implement. Multicast connections require large amounts of overhead to implement whereby each call must be routed through the network backbone. Multicast connections also require special call setup procedures which can be potentially draining on system resources if the number of connections is large.

Another disadvantage is that the network backbone must be used to establish many of the connections. The connections that must be routed through the backbone include any connection between two different switches.

Wave Division Multiplexing

Wave division multiplexing (WDM) technology enables the simultaneous transmission of multiple data channel connections on the same physical optical fiber. This is achieved by utilizing several different wavelengths on the same optical fiber at the same time. A diagram illustrating a prior art WDM transmission network is shown in FIG. 4. The transmission network, generally referenced 30, comprises a plurality of optical transmitters 32 labeled transmitter #0 through transmitter #3, a wave division multiplexor 34, optical transmitter 36, optical fiber transmission line 38, optical receiver 40, wave division demultiplexor 42 and a plurality of optical receivers 44 labeled receiver #0 through receiver #3.

Using the this type of network, several data sources can be sent simultaneously into the WDM mux 34 whereby each data source uses a different wavelength. The optical WDM mux 34 functions to combine the different wavelengths into one optical transmission light beam. This optical light beam is transmitted onto the optical fiber 38 using the optical transmitter 36. The fiber carries the four connections simultaneously. The optical light beam reaches the optical receiver 40 which outputs the light beam to WDM demux 42. The WDM demux functions to split the optical light beam into the different wavelengths that were originally sent. The different wavelgnth outputs of the WDM demux are intput to the individual receivers 44 which convert the light energy into electrical signals.

Currently, the major use of WDM technology is in Wide Area Network (WAN) applications. The majority of WANs already have a large installed base of optical fiber. The optical fiber installed in WANs typically carry very high data rate traffic on the order of many gigabits per second. In addition, the demand for bandwidth and capacity is growing at an explosive rate. Today's WAN installations are being pushed to capacity in order to satisfy the demand for increasing levels of bandwidth.

Two different techniques can be used to transmit data at higher rates: (1) adding additional optical fibers or (2) increasing the rate of data at the edge devices on either end of the optical fiber both of these solutions are very costly: installing additional fiber optic cable is very costly and developing faster end equipment is difficult and expensive.

Currently available WDM technology, however, is a viable alternative to installing new fiber optic cable or upgrading the equipment on either end of the fiber. Using conventional WDM technology, several 'slow' conventional end devices can be connected to a WDM mux, such as WDM mux 34 (FIG. 4), whereby several slower data sources are combined onto the same fiber and transmitted to the other end. At the far end of the fiber optic cable, the operation is reversed, i.e., the optical signal is optically WDM demuxed. Thus, WDM technology can be used as a bandwidth concentrator.

SUMMARY OF THE INVENTION

Throughout this document the term ring topology or ring network denotes a network whereby all devices on the network are connected in a ring formation. Every device on the ring is coupled to the ring network such that each device is directly connected only to its two neighbors. The term wave division multiplexing (WDM) denotes using a single optical fiber to transmit several communications channels simultaneously whereby each channel transmits data utilizing a different wavelength of light. The term dense wavelength division multiplexing (DWDM) denotes WDM that utilizes several wavelengths of light that are relatively close to one another.

The type of environment suitable for application of the present invention is any data communications network such as found on college campuses or other large enterprises. Many companies that currently implement data networks with backbones using switched Ethernet and/or ATM technology can benefit from the features of the present invention. The ring network of the present invention, in combination with wave division multiplexing, provides a novel solution to the problems of the prior art as described hereinabove.

The present invention utilizes WDM technology to construct a ring type network suitable for use in both WAN and LAN environments. The network is constructed having a ring topology with a plurality of nodes connected around the ring in daisy chain fashion. Direct connections between any two end users can be established in a straightforward manner. Each connection between end users utilizes a separate specific wavelength.

Devices are connected to the ring network via an optical add/drop module (OADM). Each connection is assigned a separate wavelength. Wavelengths pass through the OADM device on nodes that are intermediary to the two end nodes on either side of the connection. In a unicast connection, only the two end nodes transmit or receive the optical signals on the particular wavelength assigned to the connection. In a multicast connection, the source node transmits and each destination node receives the optical signals on the particular wavelength assigned to the connection. Thus, a single fiber optic cable functions as a wideband media connection for several edge devices as well as several switching devices. Capacity in the network can be easily increased simply by adding more optical channels on the fiber, with each channel being assigned a different wavelength.

There is provided in accordance with the present invention an optical add drop module (OADM) connected to an ingress optical input and an egress optical output comprising a 1 to N wave division multiplexing (WDM) demultiplexor coupled to the ingress optical input, the WDM demultiplexor outputting N optical channels each the channel corresponding to a different wavelength, an N channel optical coupler connected to the N optical channels output of the WDM demultiplexor, the optical coupler outputting N optical pass through channels and N optical drop channels, an N channel optical receiver adapted to receive the N optical drop channels output by the optical coupler, the optical receiver for converting optical input signals to electrical output signals, an N channel fiber switch adapted to receive the N pass through channels output from the optical coupler and N optical add channels, the fiber switch outputting N output optical channels wherein each channel consists of either the optical pass through signal or the optical add signal selected in accordance with a channel control signal an N channel optical transmitter adapted to receive N electrical add channels and to output the N optical add channels, the optical transmitter for converting electrical input signals to optical output signals and an N to 1 WDM multiplexor coupled to the N output optical channels from the fiber switch and operative to combine the N output 15 optical channels into a single channel for transmission over the egress optical output.

The optical coupler comprises N 1 to 2 optical couplers, each 1 to 2 optical coupler associated with a different wavelength and the fiber switch comprises N 2 to 1 optical switches, each 2 to 1 optical switch associated with a different wavelength.

The fiber switch comprises means for switching between the optical pass through signal or the optical add signal on a channel by channel basis. The optical coupler is operative to drop an optical signal received over the ingress optical input while the fiber switch is operative to simultaneously pass the optical signal to the egress optical output.

There is also provided in accordance with the present invention an optical add drop module (OADM) based local area network (LAN), a plurality of end users connected to the LAN, the local area network comprising a plurality of nodes wherein each node is connected to its two nearest neighbors nodes thus forming a ring network, a plurality of optical add drop modules, each the node having at least one optical add drop module located therein, the optical add drop module for connecting the node to the ring network, means for establishing unicast connections between a source end user and a destination end user wherein multiple unicast connections are established simultaneously with each the unicast connection utilizing a different wavelength of light on the ring network and means for establishing multicast connections between a source end user and a plurality of destination end users wherein protocols can be in use simultaneously on the ring network, wherein unicast connections are established between a source end user and a destination end user, multiple simultaneous unicast connections utilize a different wavelength for each unicast connection and means multicast connections are established between a source end user and a plurality of destination end users, multiple simultaneous multicast connections utilize a different wavelength for each multicast connection.

Different protocols utilize different wavelengths of light so as to enable a plurality of protocols to be in use simultaneously on the ring network. Different protocols can utilize the same wavelength of light yet their corresponding connections do not overlap along the ring network so as to enable a plurality of protocols to be in use simultaneously on the ring network.

A plurality of unicast connections can be established simultaneously on the ring network all utilizing the same wavelength whereby none of the unicast connections overlap each over along the ring network. In addition, a plurality of multicast connections can be established simultaneously on the ring network all utilizing the same wavelength whereby none of the multicast connections overlap each over along the ring network.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| ANSI | American National Standards Institute |
| ATM | Asynchronous Transfer Mode |
| CCITT | Comite Consulatif International Telegraphique et Telephonique |

-continued

| Term | Definition |
|---|---|
| DWDM | Dense Wavelength Division Multiplexing |
| FDDI | Fiber Distributed Data Interface |
| IP | Internet Protocol |
| ITU | International Telecommunications Union |
| LAN | Local Area Network |
| LANE | LAN Emulation |
| MC | Multicast |
| NIC | Network Interface Card |
| OADM | Optical Add Drop Module |
| SONET | Synchronous Optical Network |
| TCP | Transmission Control Protocol |
| UNI | User to Network Interface |
| VCI | Virtual Circuit Indicator |
| VPI | Virtual Path Indicator |
| WAN | Wide Area Network |
| WDM | Wavelength Division Multiplexing |

General Description

Figure 1:
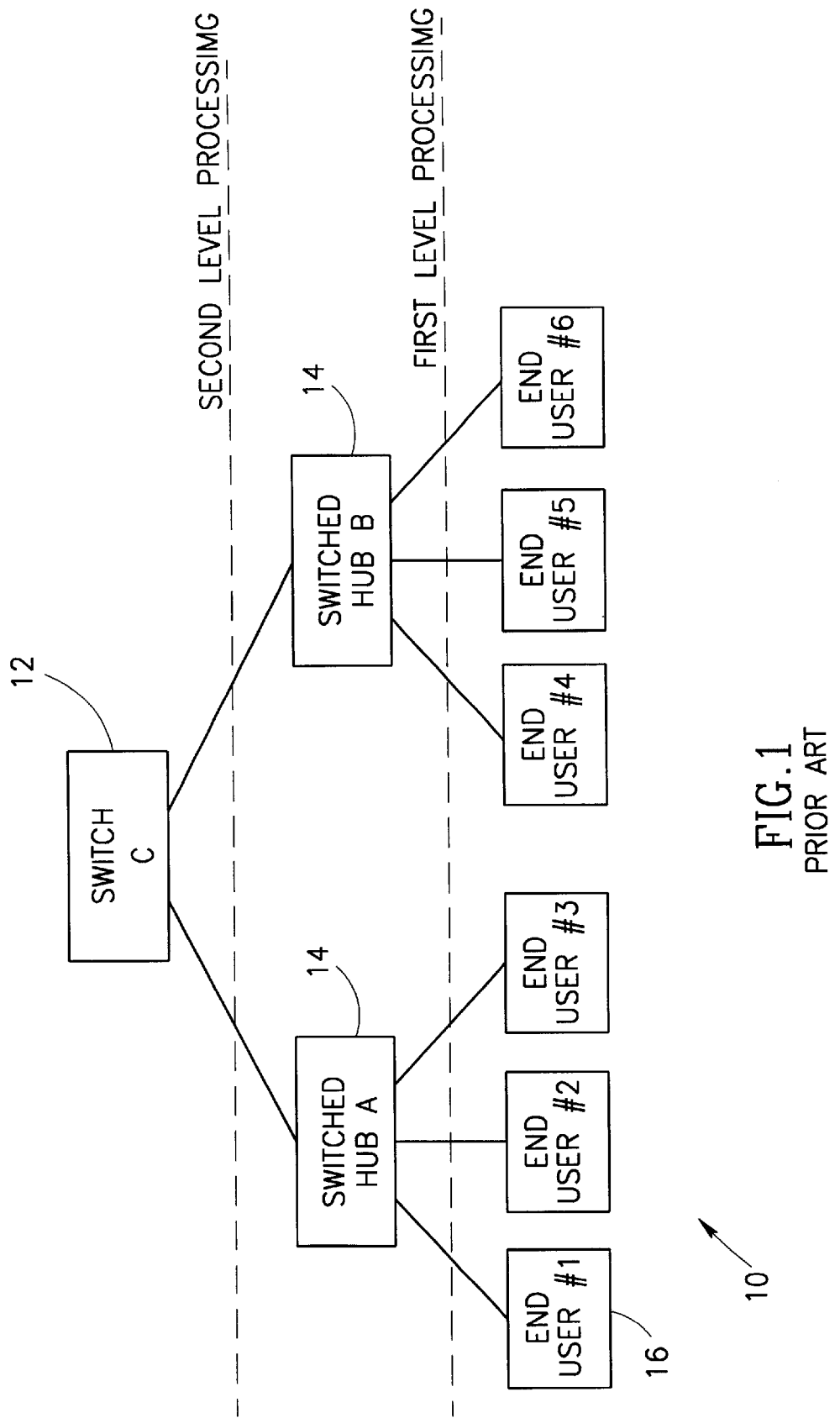
FIG. 1 is a diagram illustrating a prior art example network having multiple levels.
Figure 2:
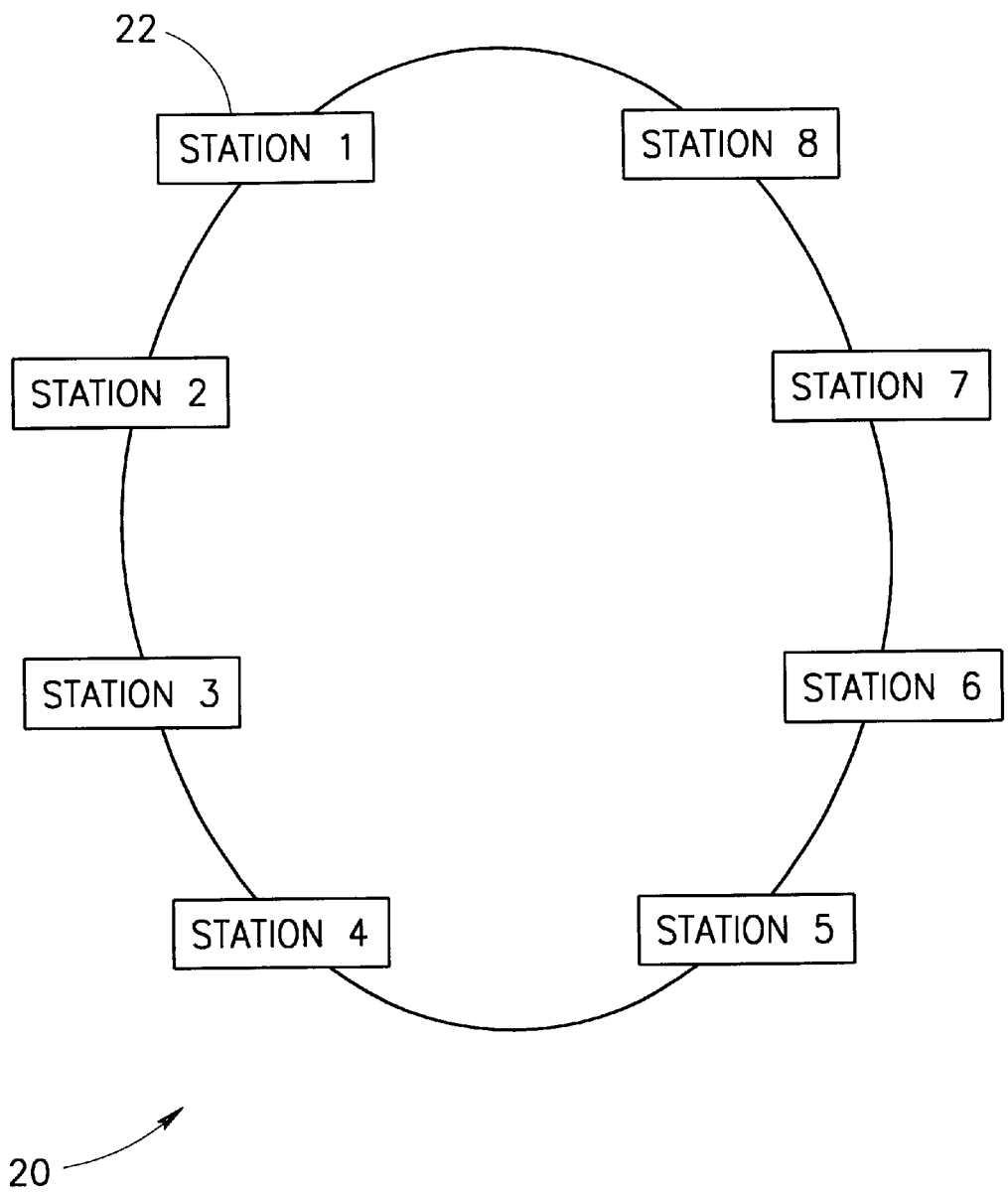
FIG. 2 is a diagram illustrating a prior art Token Ring network.
Figure 3:
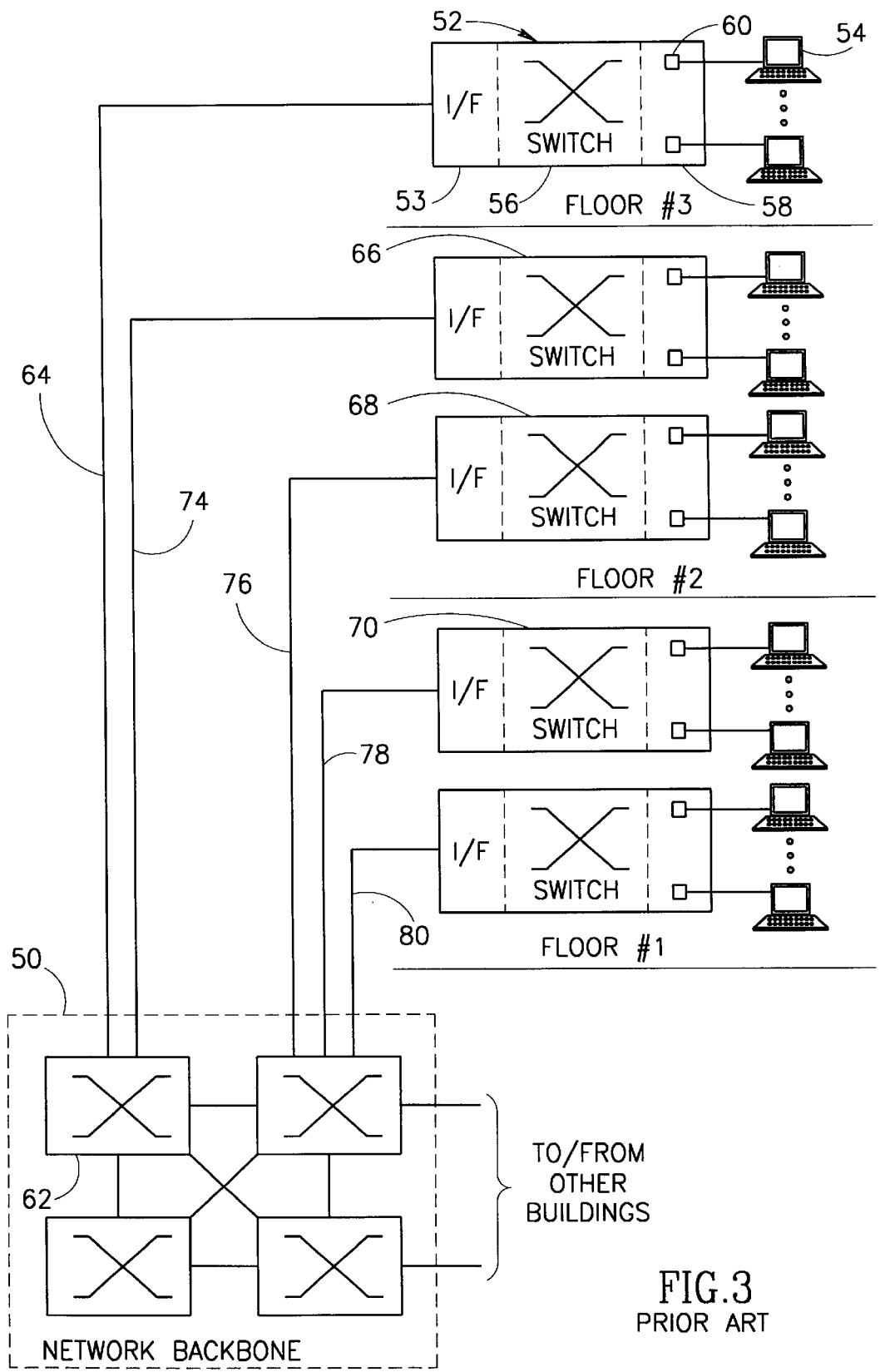
FIG. 3 is a diagram illustrating the network topology of an example building infrastructure using prior art network equipment.
Figure 4:
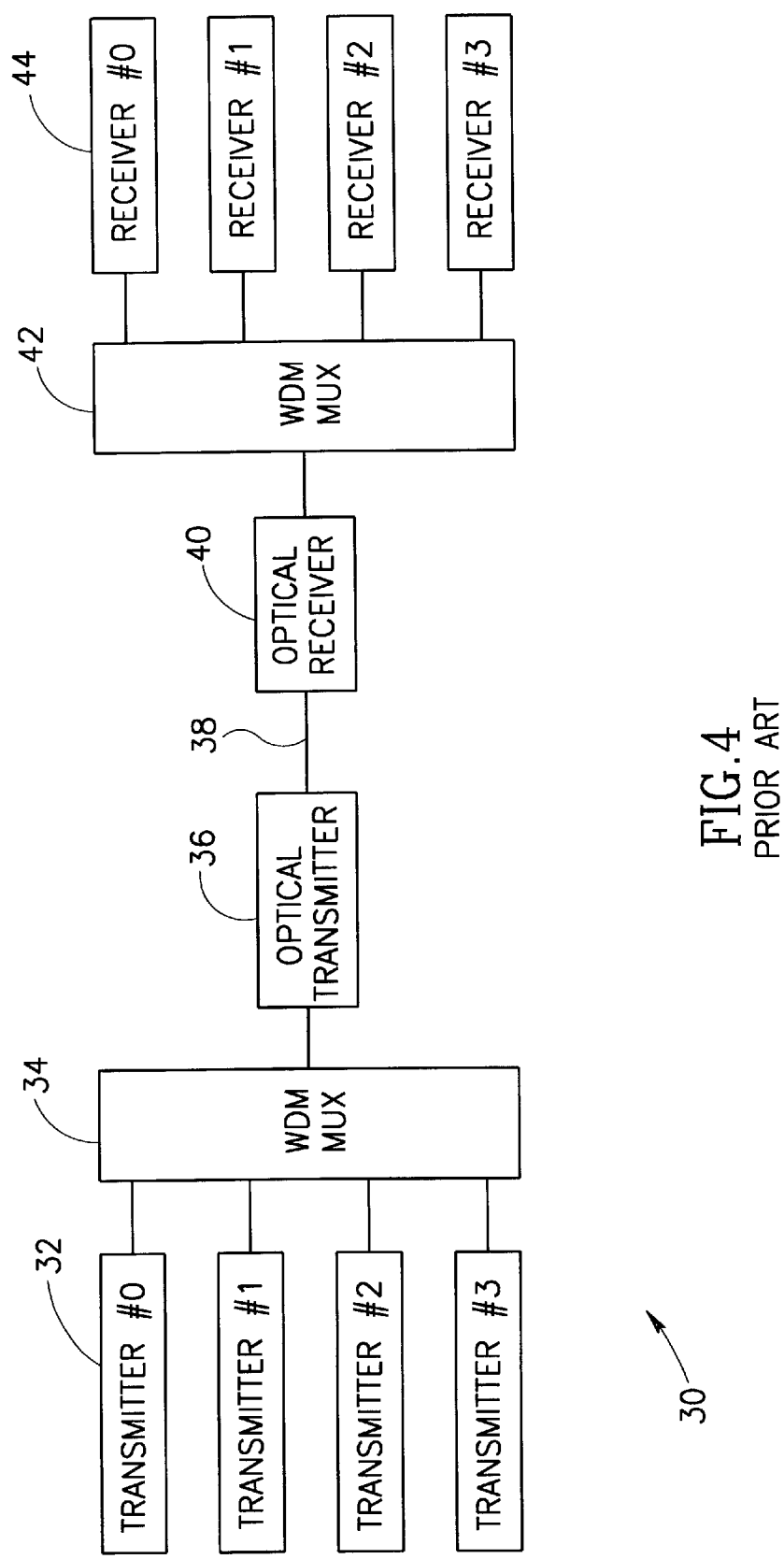
FIG. 4 is a diagram illustrating a prior art WDM transmission network.
Figure 5:
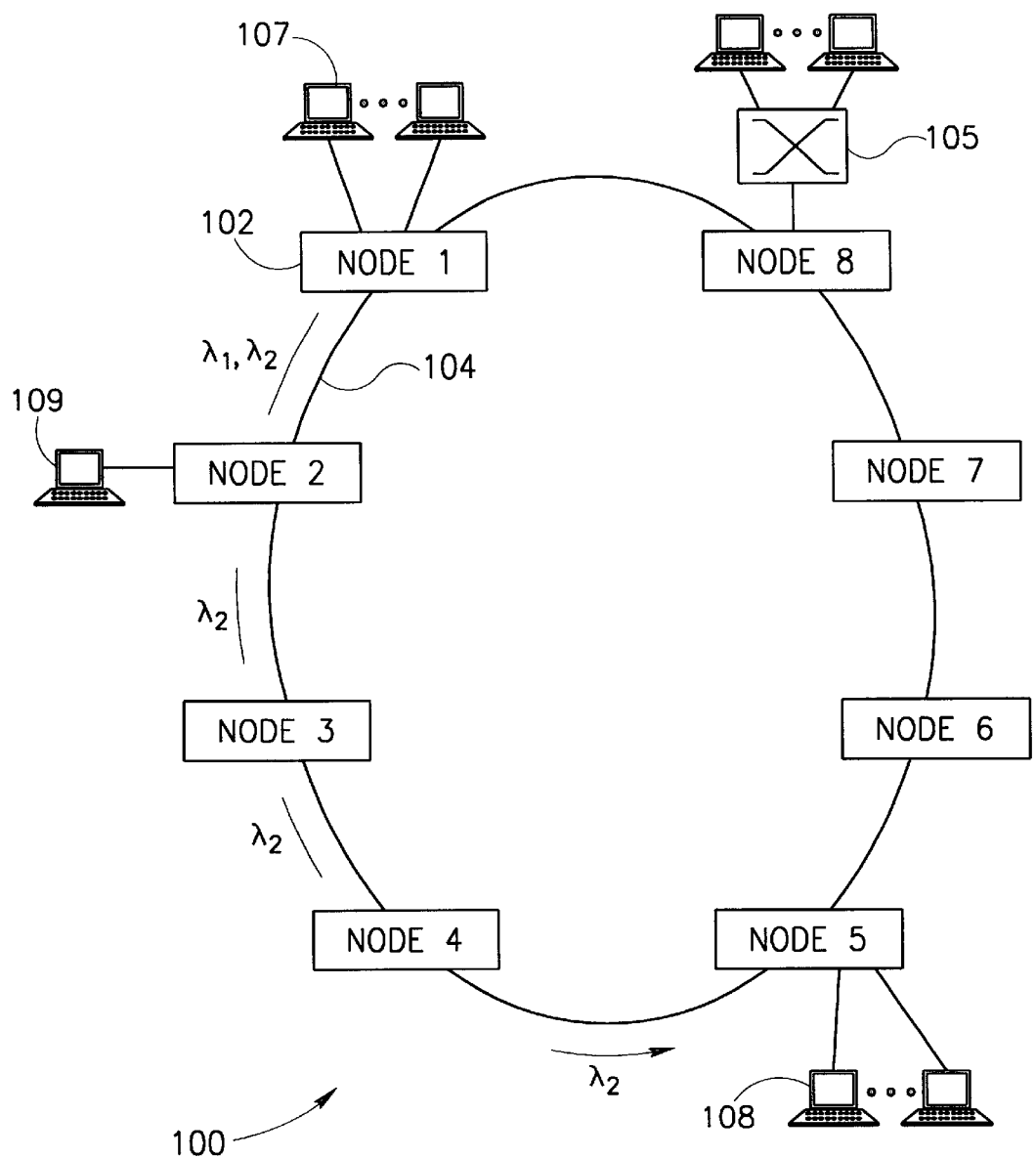
FIG. 5 is a diagram illustrating an optical network constructed utilizing the optical add drop module of the present invention.

A diagram illustrating an optical network constructed utilizing the optical add drop module of the present invention is shown in FIG. 5. The ring network, generally referenced 100, comprises a plurality of nodes 102 labeled node 1 through node 8 connected by fiber optic cable 104. Fiber optic cable 104 may comprise one or more optical fibers depending on the capacity and configuration of the ring network 100. Note that the switch 105 can be physically part of node 8 or can be a logically different functional block within the node. Although a ring network comprising eight nodes is shown, ring networks of any number of nodes can be constructed without departing from the spirit and scope of the present invention.

All network devices such as edge devices and core switches are connected to the optical ring network via the nodes. For example, edge devices (end users) 107 are connected to node 1. A switch 105 supporting a plurality of end users is shown connected to node 8. Each node 102 is connected to its two closest neighbors. For example, node 7 is connected to node 8 and node 6. Each node comprises at least one WDM Optical add drop module (OADM) (not shown) which functions to connect each edge device and core switch to the ring network.

When, for example, an edge device connected to node 3 wants to communicate with an edge device connected to node 7, a channel is established whereby a particular wavelength is assigned to the connection. Data is transmitted on the channel using the assigned wavelength. The optical signal having this wavelength passes through all the intermediary nodes connected on the ring network that are not configured to 'hear' that particular wavelgnth. Only node 7 is configured to listen to that particular wavelength and receive the information to be passed on to the edge device connected to node 7.

Using the ring network of the present invention, a single fiber optic cable can serve as a media connection for several edge devices in addition to several switching devices as well. The bandwidth problem of the prior art no longer exists since the bandwidth of a single channel, i.e., a single wavelength, is multiplied by the number of WDM optical channels operating simultaneously on the optical fiber.

Further, the wiring requirement is minimized since all the edge and core switch devices are connected to nodes that are, in turn, connected together using a minimum cable length cable. Also the switching that was performed on the core switches in prior art networks, is now distributed over the WDM optical interfaces on all the edge devices.

A local area network (LAN) can be constructed the ring network of the present invention. Direct connections are created between any two end users whereby each direct connection utilizes a specific wavelength. Each node can be configured such that each end user has knowledge of the mapping between each connection and its corresponding wavelength, each connection being associated with a source and destination. Thus, the source knows which wavelength to use for transmission onto the ring network and the destination knows which wavelength to be 'listening' to in order to receive the data.

The nodes, i.e., end users, along the path (ring) from the source to the destination do not interfere with the optical signal with that particular wavelength. These intermediary nodes pass it along optically but do not process it electronically or otherwise. In this manner, the processing resource needs of each node on the ring can be reduced due to the optical switching functions performed by the OADM in each node.

As an example of WDM used for a LAN application, assume that end user 107 connected to node 1 establishes two connections: one connection to end user 109 connected to node 2 and a second connection to end user 108 connected to node 5. Node 1 transmits data to node 2 using wavelength $\lambda_1$ and simultaneously transmits data to node 5 using wavelgnth $\lambda_2$. Nodes 2, 3 and 4 optically pass the received optical signal with wavelength $\lambda_2$ without performing any electrical processing. The optical signal with wavelength $\lambda_2$ is received and processed electrically by node 5. Thus, electrical processing is only performed on the end nodes associated with the connections, i.e., nodes 1, 2, and 5.

Figure 6:
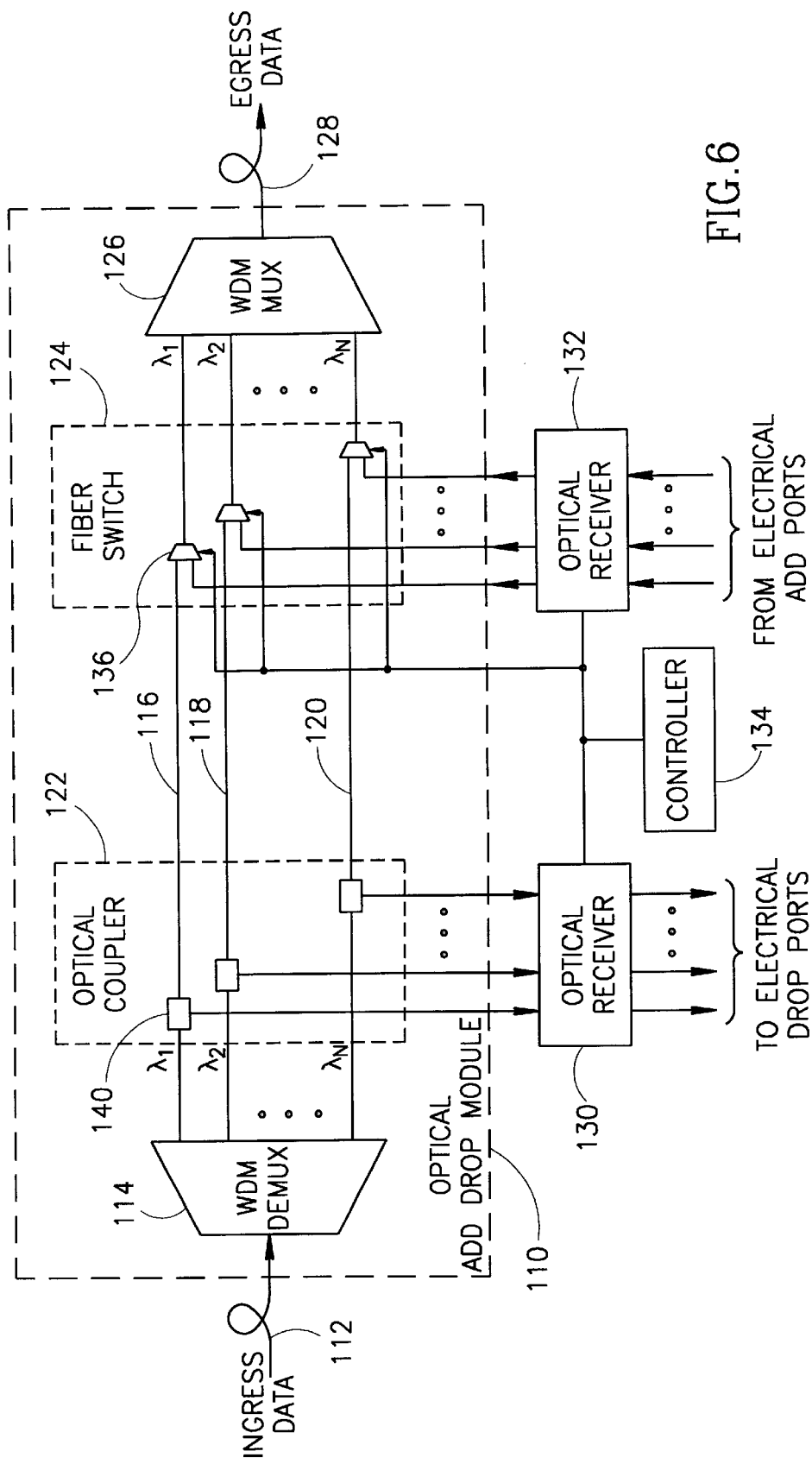
FIG. 6 is a block diagram illustrating the optical add/drop module of the present invention in more detail.

A block diagram illustrating the optical add drop module of the present invention in more detail is shown in FIG. 6. Each node (station) on the ring network has at least one optical add drop module (OADM), generally referenced 110. The OADM functions to simultaneously drop one or more optical signals from the ingress optical fiber 112 while adding one or more optical signals to the egress optical fiber 128. Thus, the OADM enables the simultaneous dropping and passing of optical signals. One node may be transmitting on a particular wavelength but more than one node can be receiving thus enabling multicast connections.

Multicast connections use a single wavelength of light from a source node to several destination nodes without requiring any processing to be performed on the nodes. The data passes optically through the intermediary nodes that are connected on the ring.

The OADM 110 comprises a WDM demux 114, optical coupler 122, fiber switch 124, WDM mux 126, optical receiver 130, optical transmitter 132 and controller 134. The ingress optical fiber 112 carries a plurality of optical signals input to the WDM demux 114. WDM demux 114 is a 1 to N optical demultiplexor. The input optical signal is split into N different optical signals each having a different wavelength, i.e., $\lambda_1, \lambda_2 \ldots \lambda_N$. A sutable 1 to 4 optical WDM demux is the 4 channel narrow band Dense WDM demux model WD5555BD manufactured by JDS Fitel, Inc., Ontario, Canada. Optical channel spacings on the order of 8 nm can be achieved with this dense WDM demux device.

Each optical signal output from the WDM demux is input to the optical coupler 122. The optical coupler functions to split the input optical signal into two output signals: an optical pass through signal and an optical drop signal. Each optical channel input to the optical coupler is split into two output optical signals via 1 to 2 optical couplers 140. A separate 1 to 2 optical coupler 140 is associated with each input channel. One of the two outputs of each 1 to 2 optical couplers is input to the fiber switch 124 and the other output is input to the optical receiver 130. A sutable 1 to 2 optical coupler 140 that can be used to construct the optical coupler 122 is the Interfuse 945 series of fiber optic couplers, part number 945-170-1000, manufactured by Amphenol Fiber Optic Products, Lisle, Ill.

One of the outputs for each channel of the optical coupler 122 is input to the N channel optical receiver 130 which functions to convert each optical input signal to an electrical output signal. Optionally, a control signal input from the controller 134 determines which of the channels in the optical receiver are enabled and which are disabled, to save power, etc. The electrical signals output from the optical receiver constitute the optical signals to be dropped at that particular node. A suitable optical receiver module that can be used to construct a multichannel optical receiver is the PGR 5025 Optical Receiver Module manufactured by Ericsson Components AB, Kista-Stockholm, Sweden. Each of the receive channels is tuned to receive an optical signal on a specific wavelength.

One of the two outputs of each channel of the optical coupler 122 is input to the fiber switch 124 which comprises a plurality of 2 to 1 optical switches 136 which function as optical 2 to 1 multiplexors. The two inputs to each channel of the fiber switch 124 include one of the outputs of the optical coupler and an output of the optical transmitter 132. In particular, optical fiber 116 is input to the first 2 to 1 switch, optical fiber 118 to the second up to optical fiber 120 which is input to the Nth switch. In accordance with an input control signal, each 2 to 1 switch 136 outputs either the optical signal output from the optical coupler 122 or the output from the optical transmitter 132. A suitable 2 to 1 switch 136 that can be used to construct an N channel fiber switch 124 is the SL, SR or SW series of Fiber Optic Switch Modules manufactured by JDS Fitel, Inc., Ontario, Canada.

It is an impoltant feature of the present invention that the OADM functions to drop optical signals while simultaneously passing them through to the egress fiber. This enables the establishment of multicast connections wherein a source node transmits on a particular wavelength to multiple destination nodes. Each node between the source node and the last destination node on the ring functions to receive the optical signal and pass it through to the adjacent node located downstream from it.

The optical transmitter 132 functions to convert electrical signals to be added to the ring network into optical signals. The optical signals generated by the optical transmitter are intput to one of the two inputs of the 2 to 1 switches 136 of the fiber switch 124. The enabling and disabling of each channel in the optical transmitter 132 can optionally be controlled by the controller 134. The Optical Transmitter Module part number PGT 5035, manufactured by Ericsson Components AB, Kista-Stockholm, Sweden, is suitable for use in constructing an N channel optical transmitter. Each channel is tuned to generate an optical signal on a specific wavelength.

The N optical channels output of the fiber switch 124 are input to the N to 1 WDM mux 126. The WDM mux 126 functions to combine the N optical input channels onto a single egress optical fiber 128. The of the N input optical signals wavelengths, each having a different wavelength, i.e. $\lambda_1, \lambda_2 \ldots \lambda_N$ are combined into a single optical signal. A suitable 4 to 1 optical WDM mux is the 4 channel narrow band Dense WDM mux model WD5555BM manufactured by JDS Fitel, Inc., Ontario, Canada. Optical channel spacings on the order of 8 nm can be achieved with this dense WDM mux device.

Figure 7:
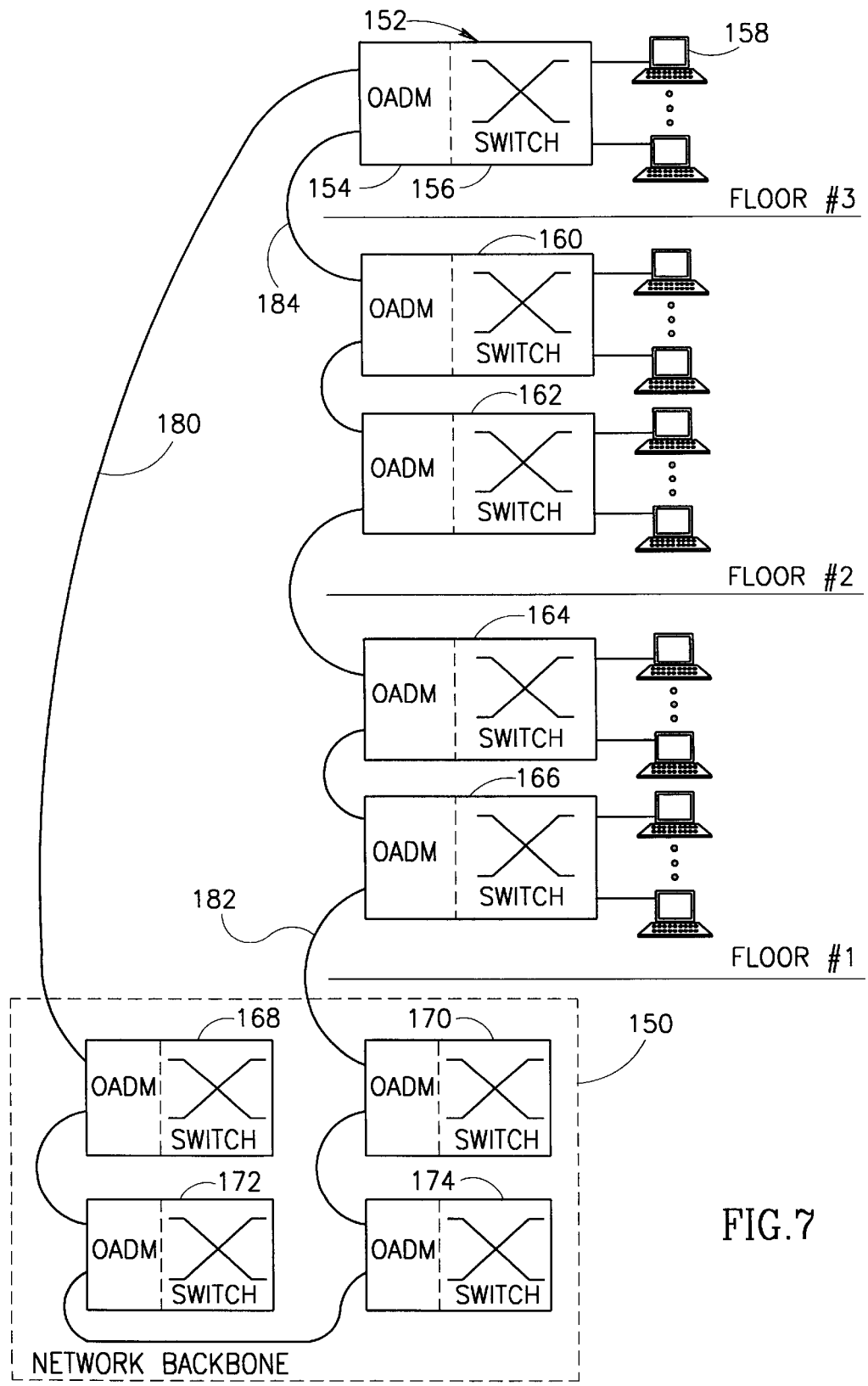
FIG. 7 is a diagram illustrating the network topology of an example building infrastructure that uses a single protocol and is constructed utilizing the optical add drop module of the present invention.

A diagram illustrating the network topology of an example building infrastructure that uses a single protocol and is constructed utilizing the optical add drop module of the present invention is shown in FIG. 7. The OADM device can be used to construct networks where each node is connected to its two nearest neighbors. Each switch 152 in the network comprises a switch portion 156 and an OADM interface portion 154. The switch portion 156 functions to provide the local switching for a plurality of attached end users 158. In the example shown, floor #1 comprises two switches 164, 166; floor #2 comprises two switches 160, 162 and floor #3 comprises a single switch 152. The network backbone 150 comprises four switches 168, 170, 172, 174 connected to the ring network in daisy chain fashion. Optical fiber cable connects the switches together to form the ring. Fiber optic cables 180, 182 connect switches 152, 166, respectively, to the network backbone 150.

Each switch comprises an OADM to enable it to interface to the ring. The OADM replaces large amounts of electrical processing with simpler optical processing. Rather then requiring the use of high speed costly electronics, the OADM enables the use of less costly slower electrical processing components. Thus, the OADM interface is typically cheaper to produce than the complex interfaces of prior art switches, e.g., ATM, FDDI, Ethernet, Token Ring, SONET, etc.

It is important to note that in contrast to the network configuration of prior art topologies, the present invention enables the network backbone to connect to the network ring using only two fiber optic connections. This example also shows the use of a single protocol, e.g., Ethernet, on the ring network. In addition, each end station or floor is connected to its neighbors in the floor above and the floor below it. Each floor is connected to the backbone via the ring.

The advantages of this configuration include the savings in terms of both material costs and installation labor expenses. Much less fiber optic cable is required to implement a ring network using the OADM of the present invention. In addition, very high bandwidths can be achieved on the ring network by using a plurality of wavelengths. As users on the network demand more and more bandwidth, additional bandwidth can be added relatively easily by adding additional wavelengths, wherein each additional wavelength represents an another optical channel.

Another advantage is the enablement of multicast connections and the ease by which they can be established. Using the OADM, any number of nodes can be configured to receive the optical signal on a particular wavelength. Multicast connections from a source to multiple destinations do not require any processing by the network backbone. In fact, depending on the location of the source and destination nodes, the optical signals may not even pass through the network backbone at all.

Another advantage is that connections between different switches do not require processing by the network backbone. The network backbone simply passes the wavelengths that are not destined for it. Also, it is possible for more than one connection to be established on the same wavelength simultaneously as long as the source and destination nodes for each connection do not overlap each other, i.e., are located on different portions of the ring network.

Figure 8:
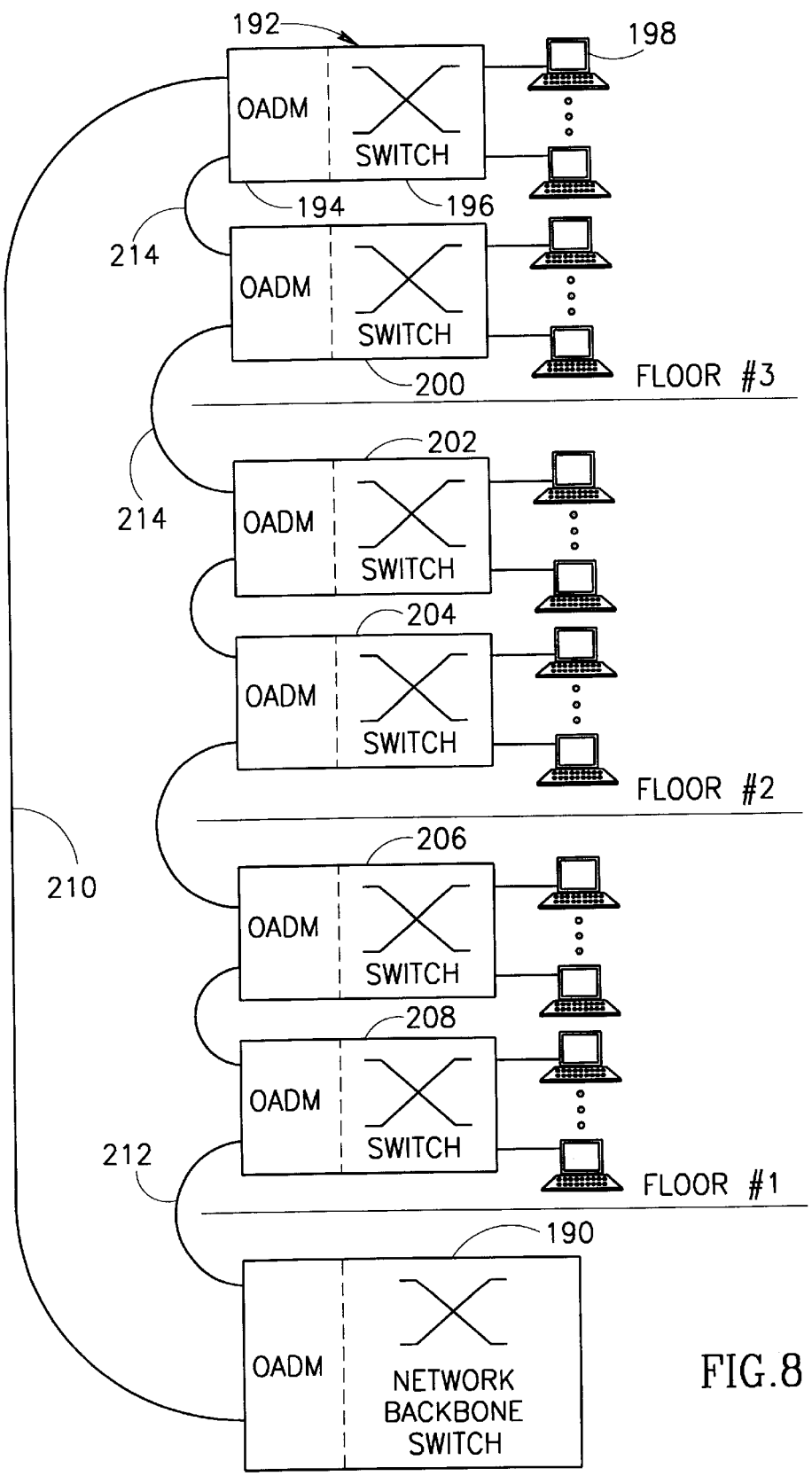
FIG. 8 is a diagram illustrating the network topology of an example building infrastructure that uses multiple protocols and is constructed utilizing the optical add drop multiplexor of the present invention.

A diagram illustrating the network topology of an example building infrastructure that uses multiple protocols and is constructed utilizing the optical add drop module of the present invention is shown in FIG. 8. An important feature of the present invention is that the OADM enables different protocols to be active simultaneously on the ring whereby each protocol uses a different wavelength. Note that two or more connections can utilize the same wavelength at the same time as long as the connections do not overlap anywhere along the ring.

The ring network comprises a plurality of switches wherein each switch is constructed to handle a particular protocol via a switching portion 196. The switching portion provides switching functionality for the switch in addition to providing connections for a plurality of end users 198. Every switch comprises an OADM interface portion 194 to enable the switch to communicate over the ring network. In particular floor #1 comprises an ATM switch 206 and an FDDI switch 208; floor #2 comprises an Ethernet switch 202 and an ATM switch 204; floor #3 comprises an Ethernet switch 192 and a FDDI switch 200. A network backbone 190 is connected to the ring via fiber optic cables 210, 212.

Connections between switches of the same protocol are established using similar wavelengths. Each switch ignores optical signals associated with protocols other than their own protocol. For example a connection between Ethernet switches 192 and 202 is established using a specific wavelength, e.g., $\lambda_1$. Alternatively, several wavelengths may be used, depending on the number of connections. Simultaneously, a colnection between ATM switches 204 and 206 is established using a different wavelength, e.g., $\lambda_2$.

Connections made between switches handling similar protocols are transparent to switches handling other protocols. Connections between switches of differing protocols, however, are established using the network backbone switch 190 for protocol conversion. In the example presented, the network backbone is capable of converting between the protocols in use on the ring, i.e., Ethernet, ATM and FDDI. For example, the network backbone is capable of translating Ethernet to/from ATM to permit end users attached to switches 192 and 204 to communicate with each other.

In addition, the network backbone can provide some form of LANE service to permit virtual LANs to be created. LANE permits end users attached to switches running different protocols to participate by being grouped into virtual LANs.

Another advantage of the ring network topology of the present invention is that the intelligence to perform the protocol conversions is localized in one or more switches constituting the network backbone. This simplifies upgrades and maintenance by localizing the protocol conversion functionality which functions to reduce the cost of each switch used in the network. Using the OADM, the switches do not need complex interface and protocol conversion means. The cost savings can add up for buildings with a large number of floors, as the switches represent a large percentage of the total cost.

Similar to the ring network of FIG. 7, this ring network enables the establishment of multicast connections. Multicast connections between switches of the same protocol can be established without using complex processing by the switches on the network backbone as explained in more detil hereinabove.

While the invention has been described with respect to a limited number of embodiments, it will be appreciated that many variations, modifications and other applications of the invention may be made.

What is claimed is:

1. An optical add drop mpdule (OADM) connected to am ingress optical input and an egress optical output, comprising:

a 1 to N wave division multiplexing (WDM) demultiplexor coupled to said ingress optical input, said WDM demultiplexor outputting N optical channels each said channel corresponding to a different wavelength;

a N channel optical coupler connected to said N optical channels output of said WDM demultiplexor, said optical coupler outputting N optical pass through channels and N optical drop channels;

an N channel optical receiver adapted to receive said N optical drop channels output by said optical coupler, said optical receiver for converting optical input signals to electrical output signals;

an N channel optical switch adapted to receive said N pass through channels output from said optical coupler and N optical add channels, each channel outputting, in accordance with a channel control signal, either said optical pass through signal or said optical add signal;

an N channel optical transmitter adapted to receive N electrical add channels and to output said N optical add channels, said optical transmitter for converting electrical input signals to optical output signals;

an N to 1 WDM multiplexer coupled to said N output optical channels from said optical switch and operative to combine said N output optical channels into a single single channel for transmission over said egress optical output;

a controller adapted to generate said N channel control signals input to said N optical switches;

wherein each channel of said OADM is operative to drop an optical signal received via said ingress input while simultaneously optically coupling said optical signal to said egress optical output; and wherein each channel participates in optical multicast connections whereby an optical signal generated at a single source node is dropped at multiple destinations while simultaneously being passed optically to a downstream node.

2. The optical add drop module according to claim 1, wherein said optical coupler comprises N 1 to 2 optical couplers, each 1 to 2 optical coupler associated with a different wavelength.

3. The optical add drop module according to claim 1, wherein said optical switch comprises N 2 to 1 optical switches, each 2 to 1 optical switch associated with a different wavelength.

4. The optical add drop module according to claim 1, wherein said optical switch comprises means for coupling either said optical pass through signal or said optical add signal to the output thereof on a channel by channel basis.

5. The optical add drop module according to claim 1, wherein said optical coupler is operative to drop an optical signal received over said ingress optical input while said fiber switch is operative to simultaneously pass said optical signal to said egress optical output.

6. An optical add drop module (OADM) based on a local area network (LAN), a plurality of end users connected to said LAN, said local area network comprising:

a plurality of nodes wherein each node is opticaly connected to its two nearest neighbor nodes thus forming an optical ring network;

a plurality of optical add drop modules, each said node having at least one optical add drop module located therein, said optical add drop module for connecting said node to said optical ring network, each said optical add drop module comprising:

a 1 to N wave division multiplexing (WDM) demultiplexor coupled to an ingress optical input, said WDM demultiplexor outputting N optical channels each said channel corresponding to a different wavelength;

an N channel optical coupler connected to said N optical channels output of said WDM demultiplexor, said optical coupler outputting N optical pass through channels and N optical drop channels;

an N channel optical receiver adapted to receive said N optical drop channels output by said coupler, said optical receiver for converting optical input signals to electrical output signals;

an N channel optical switch adapted to receive said N pass through channels output from said optical coupler N optical add channels, each channel outputting, in accordance with an independent channel control signal, either said optical pass through signal or said optical add signal;

an N channel optical transmitter adapted to receive N electrical add channels and to output said N optical add channels, said optical transmitter for converting electrical input signals to optical output signals;

an N to 1 WDM multiplexer coupled to said N output optical channels from said optical switch and operative to combine said N output optical channels into a single channel for transmission over said egress optical output;

a controller adapted to generate said N channel control signals input to said N channel optical switch;

wherein each channel of said OADM is operative to drop an optical signal received via said ingress input while simultaneously optically coupling said optical signal to said egress optical output;

wherein each channel participates in optical multicast connections whereby an optical signal generated at a single source node is dropped at multiple destinations while simultaneously being passed optically to a downstream node;

means for establishing unicast connections between a source end user and a destination user wherein multiple unicast connections are established simultaneously with each unicast connection utilizing a different wavelength of light; and means for establishing multicast connections between a source end user and a plurality of destinations end users wherein multiple multicast connections are established simultaneously with each said multicast connection utilizing a different wavelength of light.

7. The local area network according to claim 6, wherein said unicast connections are established simultaneously on said optical ring network utilizing the same wavelength of light such that no two unicast connections overlap each other along said optical ring.

8. The local area network according to claim 6, wherein said multicast connections are established simultaneously on said optical ring network utilizing the same wavelength of light such that no two multicast connections overlap each other along said optical ring.

9. The local area network according to claim 6, further comprising an optical add drop module comprises:

a 1 to N wave division multiplexing (WDM) demultiplexor coupled to an ingress optical input, said WDM demultiplexor outputting N optical channels each said channel corresponding to a different wavelength;

an N channel optical coupler connected to said N optical channels output of said WDM demultiplexor, said optical coupler outputting N optical pass through channels and N optical drop channels;

an N channel optical receiver adapted to receive said N optical drop channels output by said optical coupler, said optical receiver for converting optical input signals to electrical output signals;

an N channel fiber switch adapted to receive said N pass through channels output from said optical coupler and N optical add channels, said fiber switch outputting N output optical channels wherein each channel consists of either said optical pass through signal or said optical add signal selected in accordance with a channel control signal;

an N channel optical transmitter adapted to receive N electrical add channels and to output said N optical add channels, said optical transmitter for converting electrical input signals to optical output signals; and an N to 1 WDM multiplexor coupled to said N output optical channels from said fiber switch and operative to combine said N output optical channels into a single channel for transmission over an egress optical output.

10. A local area network (OADM) based local area network (LAN), a plurality of end users connected to said LAN, said local area network comprising:

a plurality nodes wherein each node is optically connected to its two nearest neighbor nodes thus forming an optical ring network;

a plurality of optical add drop modules, each said node having at least one optical add drop module located therein, said optical add drop module for connecting said node to said optical ring network, each said optical drop module comprising:

a 1 to N wave division multiplexing (WDM) demultiplexor coupled to an ingress optical input, said WDM demultiplexor outputting N optical channels each said channel corresponding to a different wavelength;

an N channel optical coupler connected to said N optical channels output of said WDM demultiplexor, said optical coupler connected to said N optical channels output of said WDM demultiplexor, said optical coupler outputting N optical pass through channels and N optical drop channels;

an N channel optical receiver adapted to receive said N optical drop channels output by said optical coupler, said optical receiver for converting optical input signals to electrical output signals;

an N channel optical switch adapted to receive said N pass through channels output from said optical coupler and N optical add channels, each channel outputting, in accordance with an independent channel control signal, either said optical pass through signal or said optical add signal;

an N channel optical transmitter adapted to receive N electrical add channels and to output said N optical add channels said optical transmitter for converting electrical input signals to optical output signals;

an N to 1 WDM multiplexer coupled to said N output optical channels from said optical switch and operative to combine said N output optical channels into a single channel for transmission over said egress optical output;

a controller adapted to generate said N channel control signals input to said N channel optical switch;

wherein each channel of said OADM is operative to drop an optical signal received via said ingress input while simultaneously optically coupling said optical signal to said egress optical output;

wherein each channel participates in optical multicast connections whereby an optical signal generated at a single source node is dropped at multiple destinations while simultaneously being passed optically to a downstream node; wherein different protocols can be in use simultaneously on said ring network; wherein unicast connections are estbalished between a source end user and a destination user, multiple simultaneous multicast connections utilize a different wavelenght of light for each multicast connection.

11. The local area network according to claim 10, wherein said multicast sometimes connections are established simultaneously on said optical ring network utilizing the same wavelength of light such that no two multicast connections overlap each other along said optical ring.

12. The local area network according to claim 11, wherein different protocols utilize different wavelengths of light so as to enable a plurality of protocols to be in use simultaneously on said ring network.

13. The local area network according to claim 11, wherein different protocols utilize the same wavelength of light without their corresponding connections overlapping so as to enable a plurality of protocols to be in use simultaneously on said optical ring.

14. The local area network according to claim 11, wherein said unicast connections are established simultaneously on said optical ring network utilizing the same wavelength of light such that no two unicast connections overlap each other along said optical ring.

* * * * *